United States Patent

[11] 3,596,109

[72] Inventor Harry Lee Marshall
Fort Wayne, Ind.

[21] Appl. No. 800,485
[22] Filed Feb. 19, 1969
[45] Patented July 27, 1971
[73] Assignee The Magnavox Company
Fort Wayne, Ind.

[54] PEAK DETECTION CIRCUIT
6 Claims, 2 Drawing Figs.

[52] U.S. Cl. ........ 307/235, 307/238, 307/246, 307/242, 328/67, 307/251, 307/315
[51] Int. Cl. ........ H03k 5/20
[50] Field of Search ........ 328/67, 115; 307/246, 235, 238

[56] References Cited

UNITED STATES PATENTS

| | | | |
|---|---|---|---|
| 2,466,705 | 4/1949 | Hoeppner | 330/34 |
| 2,686,263 | 8/1954 | Konick | 328/67 |
| 2,844,719 | 7/1958 | Rieke et al. | 328/115 |
| 3,469,111 | 9/1969 | Peters et al. | 307/235 |
| 3,411,018 | 11/1968 | Dapper et al. | 307/246 |
| 3,454,789 | 7/1969 | Tyler | 307/246 |
| 2,621,263 | 12/1952 | Scoles | 328/53 |

*Primary Examiner*—Donald D. Forrer
*Assistant Examiner*—Harold A. Dixon
*Attorney*—Pendleton, Neuman, Williams and Anderson

ABSTRACT: A peak detector circuit having an output proportional to the most recently assumed peak value of an amplitude varying input signal is disclosed. In the described embodiment the circuit includes an input stage, a diode-storage capacitor series combination, a variable impedance path across the capacitor, and an output stage. The impedance of the variable impedance path is controlled by the form of the input signal and is such that when no input signal is applied it has a relatively high value but when an input pulse is applied it has a relatively low value for at least part of the duration of that pulse.

Figure 1:
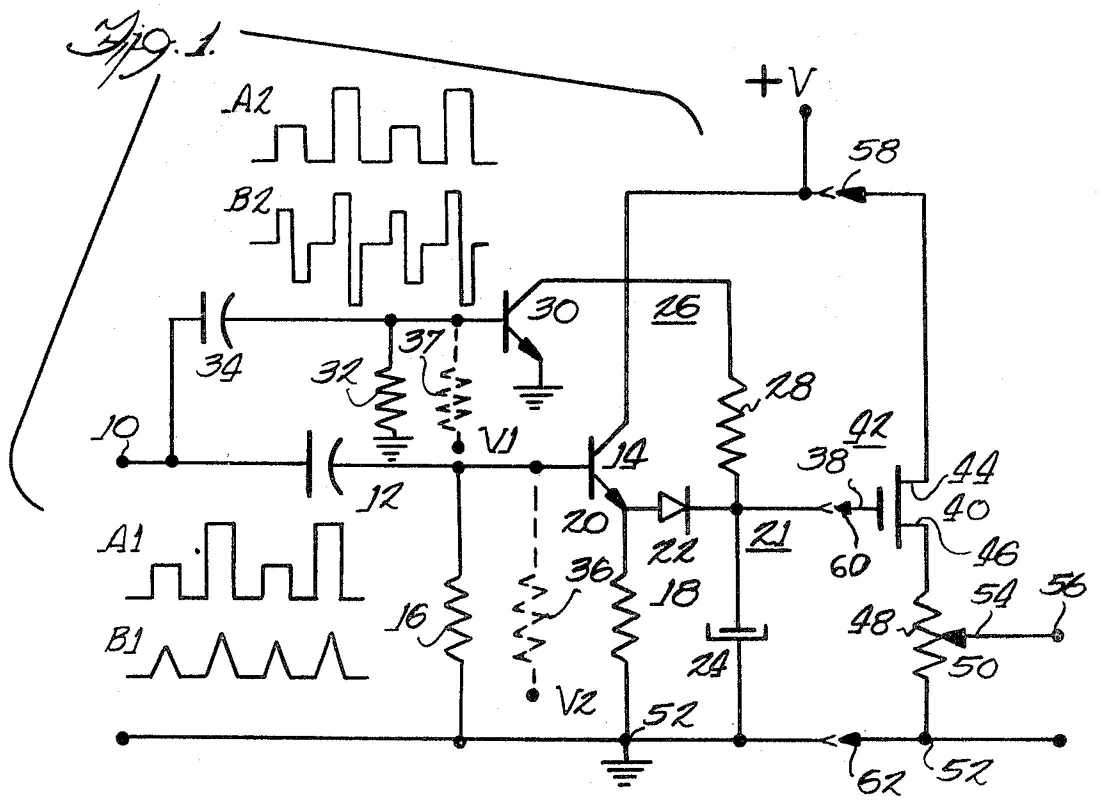

Inventor
Harry Lee Marshall
by Pendleton, Neuman, Seibold & Williams
Atty's

PEAK DETECTION CIRCUIT

PEAK DETECTION CIRCUIT

This invention relates to peak detecting electric circuits and more particularly to peak detecting hold circuits and has for one principal object the provision of an electric circuit which will indicate the magnitude of the peak values of an amplitude varying input signal.

Various circuits for detecting peaks of input wave forms and indicating the magnitude of those peaks have been proposed. These circuits, however, often exhibit disadvantages including the generation of an output signal the magnitude of which fails to represent the most recently assumed peak. Rather, such prior circuits frequently exhibit one of three characteristics, either holding the value of an applied peak for a predetermined period no matter what form the input takes during that period, holding the value of an applied peak for a predetermined period unless a peak of greater value is applied during that period and then holding the value of the greater, subsequently applied peak for that predetermined period, or holding the value of an applied peak for a substantially indefinite period until an external reset signal is applied no matter what the form of the input signal. Generally such circuits either reset themselves at the end of a fixed period after the input assumes a peak value or are reset by an external means.

Accordingly it is a further object of this invention to provide a circuit whose output is always proportional to the most recently applied peak of the input wave form. The circuit preferably has a short input time constant so that it will be sensitive to rapid variations in peak values. The output time constant is preferably such that the value of the most recent peak will be held for a relatively long period after it is applied. Additionally, it is an object of this invention to provide such a circuit which uses a relatively few number of components, is simple in design, and is therefore inexpensive to manufacture.

In carrying out this invention in one form a circuit is provided in which a storage capacitor charges through a diode to the peak value of the applied input signal. A variable impedance path is connected across that capacitor which may assume either a high or low impedance state depending on the shape of the input waveform. More specifically, a circuit is supplied having four essential elements, an input stage, a diode-storage capacitor combination, a variable impedance path across that capacitor, and an output stage. The input waveform is used to control the impedance of the variable impedance path and thus the discharge rate of the capacitor.

Figure 2:
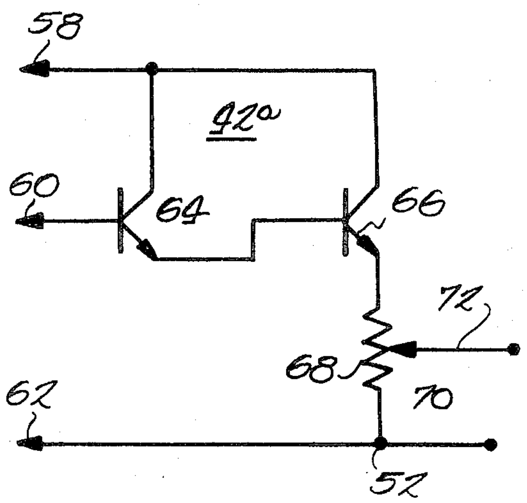

For a more complete understanding of this invention reference should now be made to the drawing wherein:

FIG. 1 is a schematic drawing of a circuit incorporating one embodiment of the present invention; and FIG. 2 is an alternative output stage for the circuit shown in FIG. 1.

Referring now to the drawing, the input waveform containing the peaks to be measured is applied to the input terminals 10 such that the peaks are in a positive going direction. The input signal is applied through input capacitor 12 to the base of NPN transistor 14. Resistor 16 is connected between the base of transistor 14 and ground. In some applications of this invention, it may be desirable to omit capacitor 12 so that transistor 14 will be DC coupled to the input terminals 10. The collector of transistor 14 is connected to a source of positive voltage and the emitter is connected to ground through emitter load resistor 18. Transistor 14 is connected as an emitter follower to present a relatively high impedance at the input of the circuit and a low output impedance to the diode-storage capacitor combination. The input stage 20 of the peak detector circuit comprises capacitor 12, transistor 14 and resistors 16 and 18. The output of input stage 20 is taken across emitter load resistor 18 and applied to storage network 21.

In parallel with resistor 18 is the diode-storage capacitor network 21 comprising diode 22 and storage capacitor 24 connected in series. When the voltage across resistor 18 is increasing positively, diode 22 will be forward biased and storage capacitor 24 will charge to the voltage appearing across resistor 18 less the small voltage drop across diode 22 required to keep it forward biased. When, however, the voltage across resistor 18 begins to decrease, the voltage across the storage capacitor 24 will be greater than that across resistor 18, diode 22 will be reverse biased, and storage capacitor 24 will remain charged at a value approximately equal to the peak value of the voltage appearing across resistor 18. It will hold this gradually decreasing level until another peak in the input signal appears. This method of using a diode-storage capacitor series combination to charge the capacitor to the peak value of an applied signal is known but forms a significant part of the present combination. Connected across the storage capacitor 24 is a variable impedance path 26 consisting of the series combination of resistor 28 and the emitter-collector circuit of NPN transistor 30. Transistor 30 is used as a switch having essentially two states, a high conductivity or saturated state and a low conductivity or cutoff state. Resistor 28 is of a relatively small value such that when transistor 30 is in its conducting state storage capacitor 24 can discharge through resistor 28 comparatively rapidly. When transistor 30 is in its nonconducting state, storage capacitor 24 will discharge only very slowly and will hold essentially the value of the applied peak voltage for a long period of time.

Connected to the base of transistor 30 is resistor 32 which is, in turn, connected to ground and input capacitor 34 normally serving to couple the input signal from input terminal 10 to the base of transistor 30. If an input signal such as that shown at A1 of FIG. 1 is applied to the circuit, a similar signal A2 would be developed across resistor 32 and applied to the base of transistor 30. When the signal equals or exceeds the level required for the emitter-base circuit of transistor 30 to conduct, normally 0.3 to 0.6 volts, storage capacitor 24 will, if charged, discharge rapidly through resistor 28 and transistor 30. Thus, in normal operation, when an input signal including pulses such as those shown at A1 is applied to the input 10, a similar signal A2 is developed across resistor 32, thus making transistor 30 conductive. This puts resistor 28 essentially in parallel with storage capacitor 24 and a voltage proportional to the peak value of the input signal is developed across storage capacitor 24 and resistor 28.

When the pulse is removed, however, transistor 30 is made essentially nonconductive so that storage capacitor 24 may not discharge through resistor 28 and storage capacitor 24 thus holds the peak value. If another pulse is then applied to the input 10, transistor 30 is again made conductive and the voltage across storage capacitor 24 and resistor 28 can either rapidly build up to a higher level if the peak of the new pulse is of greater magnitude than that of the former one or storage capacitor 24 can rapidly discharge through resistor 28 to a lower level if the peak is of lower magnitude. During the simultaneous conduction of transistors 14 and 30, the voltage across storage capacitor 24 is determined by the input to transistor 14, since the output impedance of transistor 14 is much lower than the resistance of resistor 28.

If pulses with a relatively slow fall time such as those shown at B1 are applied to the input 10, the shaped pulses applied to transistor 30 may cause transistor 30 to continue to conduct after the pulse reaches its peak value. This disadvantage may easily be cured for inputs with sufficiently short rise times by adjusting the values of resistor 32 and capacitor 34 so that they act as a differentiator for the applied input signals as is well known in the art. This requires only that the time constant of resistor 32 and capacitor 34 be short compared to the pulse duration. With such adjustment, the signal applied to the base of transistor 30 with an input such as signal B1 will appear as signal B2. Thus, transistor 30 will conduct only when the input is in a positively increasing state or is approaching a peak. When the input is in a negative going, decreasing state, storage capacitor 24 will not be able to discharge through resistor 28 and will hold the peak value of the signal appearing across resistor 18.

It has been found desirable in some applications of this invention to bias transistors 14 and 30 so that they will either be brought into conduction sooner or kept out of conduction longer than would otherwise be the case. This may be accomplished by connecting the bases of transistors 14 and 30 through resistors 36 and 37, respectively, to sources of positive or negative potential, V1 and V2, as shown dashed in FIG. 1.

The output of the circuit so far described is taken from across the storage capacitor 24. In one form of the invention the gate element 38 of an N channel, metal or silicon, field effect transistor 40 is connected to the common connection of diode 22, storage capacitor 24, and resistor 28 to form an output circuit 42. The drain element 44 of transistor 46 is connected to the source of positive voltage +V, and the source element 46 is connected through the resistive element 48 of potentiometer 50 to ground terminal 52. The output of the circuit is then taken between ground and the wiper arm 54 of potentiometer 50 and appears at terminal 56. The output voltage may be measured on a standard high impedance voltage indicating device as will be obvious to those skilled in the art. Transistor 40 has a high transconductance or ratio of drain-source current change to gate-source voltage change and a very low leakage from the gate to the source or drain when connected as a source follower such as is shown in FIG. 1. The DC voltage on the source is thus almost that on the gate.

A circuit has thus been provided in which storage capacitor 24 is charged to a value related to the peak value of the applied pulses through a low impedance source, the output of transistor 14 connected as an emitter follower. When transistor 30 is in its relatively nonconducting state, storage capacitor 24 will discharge only very slowly at a rate determined primarily by the leakage rates of diode 22, transistors 30 and 40, and capacitor 24, all of which should be very small. It is desirable that when transistor 30 is in its conducting state, capacitor 24 will discharge relatively rapidly so that, if the presently applied pulse is smaller than the immediately preceding one, capacitor 24 may discharge down to the proper value for the new peak during the length of the applied pulse. In one application it has been found desirable to have the product of the resistance of resistor 28 in ohms times the capacitance of capacitor 24 in farads (i.e., the time constnat) be less than one-fifth of the duration of the input pulses expressed in seconds. Transistor 30 should be such that it is saturated during the period of discharge.

In FIG. 2 is shown an alternative output stage **42*a* for the above disclosed circuit. It is substituted in the circuit of FIG. 1 as indicated by the arrowheads 58, 60 and 62. The output stage 42*a* consists of two NPN transistors 67 and 66 connected in a Darlington connection with the resistance element 68 of potentiometer 70 being placed between the emitter of transistor 66 and ground. The output is then taken between the potentiometer wiper arm 72 and ground 52. While this output circuit 42*a* may give acceptable results in some applications, the output stage of FIG. 1** provides additional advantages because of the generally higher input impedance and lower leakage of field effect transistors then transistors of the move conventional types.

It will be obvious that certain modifications of the specific embodiments shown may be made without departing from the spirit and scope of this invention. For example, various stages of amplification might be inserted in either the input stage 20 or the impedance varying stage 26 to amplify low level input signals to a more useful value. Other configurations might be used for the output stage 42. Also, the polarities of the diode and power source might be reversed, PNP transistors substituted for NPN and the circuit used to measure negative going peaks.

It will thus be seen that a circuit has been provided with is simple and economical, provides an output which is constantly proportional to the value of the most recently acquired peak of the input signal, and is such that it will follow rapid variations in peak magnitudes yet hold one particular value for an extended period.

The circuit has many applications and can be especially useful in generating an automatic gain control voltage in a television receiver. In that application the pulses are the horizontal synchronizing pulses with appropriate preliminary keying and amplification to eliminate the intermediate signals as is conventional in receivers now known.

While several particular embodiments of this invention are shown above it will be understood of course that the invention is not to be limited thereto since many modifications may be made and it is contemplated therefore by the appended claims to cover any such modifications as fall within the true spirit and scope of this invention.

I claim:

1. A circuit having an output signal which is related to the maximum value of the most recent peak of an amplitude varying input signal appearing across input terminals comprising:

first transistor means having an input electrode coupled to one of said input terminals, a first output electrode coupled to one terminal of a power supply, and a second output electrode coupled through a resistance means to a second terminal of said power supply;

detection means including a series combination of a diode and a capacitor coupled in parallel with said resistance means;

differentiating means coupled to said one of said input terminals;

second transistor means having an input electrode coupled to said one of said input terminals through said differentiating means, a first output electrode coupled to said second terminal of said power supply, and a second output electrode coupled to the junction of said diode and said capacitor; and output amplifier means having an input directly coupled to the junction of said diode and said capacitor and delivering said output signal.

2. The circuit of claim 1 wherein the input electrode, the first output electrode, and the second output electrode of said first transistor means are a base, collector, and emitter electrode, respectively, of said first transistor means and the input electrode, the first output electrode, and the second output electrode of said second transistor means are the base, emitter, and collector electrode, respectively, of said second transistor means.

3. The circuit of claim 2 wherein said output amplifier means comprises a field effect transistor having a gate element coupled to the junction of said diode and said capacitor, a drain element coupled to said one terminal of said power supply, and a source element coupled through a second resistance means to said second terminal of said power supply, and said output signal is taken across said second resistance means.

4. The circuit of claim 2 wherein said output amplifier means comprises third and fourth transistor means connected in the Darlington configuration with the base of said third transistor means coupled to the junction of said diode and said capacitor and said output signal is taken from the emitter circuit of said fourth transistor means.

5. The circuit of claim 1 wherein said output amplifier means comprises a filed effect transistor.

6. The circuit of claim 1 wherein said output amplifier means comprises a pair of transistors connected in the Darlington connection.